(12) United States Patent
Nakagawa

(10) Patent No.: US 7,221,310 B2
(45) Date of Patent: May 22, 2007

(54) ELECTRIC WAVE AXIS ADJUSTING APPARATUS FOR RADAR MOUNTED ON VEHICLE

(75) Inventor: Kado Nakagawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 128 days.

(21) Appl. No.: 11/131,351

(22) Filed: May 18, 2005

(65) Prior Publication Data

US 2006/0176214 A1  Aug. 10, 2006

(30) Foreign Application Priority Data

Feb. 7, 2005  (JP)  ............... 2005-030158

(51) Int. Cl.
G01S 7/40 (2006.01)
G01S 13/93 (2006.01)
B60R 21/00 (2006.01)
G01S 13/00 (2006.01)
B60R 21/0134 (2006.01)

(52) U.S. Cl. ............... 342/174; 342/70; 342/118; 342/128; 342/133; 342/147; 342/157; 342/158; 342/165; 342/173; 342/175; 342/195

(58) Field of Classification Search ........ 180/167–169; 701/300, 301; 342/5–8, 10, 11, 70–81, 147, 342/157, 158, 165–175, 195, 118, 128–133

See application file for complete search history.

(56) References Cited

U.S. PATENT DOCUMENTS 4,283,725 A * 8/1981 Chisholm .............. 342/174
5,008,844 A * 4/1991 Kyriakos et al. .......... 701/301
5,432,516 A * 7/1995 Cherry et al. ............ 342/70
5,731,779 A * 3/1998 Kikuchi ................ 342/70
6,020,844 A * 2/2000 Bai et al. ............... 342/165
6,329,952 B1 * 12/2001 Grace .................. 342/174
6,335,705 B1 * 1/2002 Grace et al. ............ 342/174
6,400,311 B1 * 6/2002 Kolbli et al. ........... 342/128
6,407,696 B1 * 6/2002 Neben et al. ........... 342/70

(Continued)

FOREIGN PATENT DOCUMENTS

JP  09-178856 A  7/1997

*Primary Examiner*—Bernarr E. Gregory
(74) *Attorney, Agent, or Firm*—Sughrue Mion

(57) ABSTRACT

The present invention provides an electric wave axis adjusting apparatus for an on-vehicle radar capable of readily and precisely adjusting an electric wave axis only by making the scanning range and a detection range identical to each other and changing a scanning range, and of adjusting the electric wave axis of an on-vehicle radar without wasting time in order to detect a reflector. In the electric wave axis adjusting apparatus for an on-vehicle radar of the present invention, an on-vehicle radar includes: a radar portion for generating the electric wave; a scanning unit for changing a transmission/reception direction of the electric wave to form within a scanning range, along with having an antenna for transmitting/receiving the electric wave; a signal processing unit for calculating a direction of the reflector based on amplitude of the reflected electric wave; and a scanning range changing unit for changing the angle of the scanning range to an axis side of the vehicle based on the direction of the reflector calculated by the signal processing means to align an electric wave axis of the on-vehicle radar with the axis.

7 Claims, 4 Drawing Sheets

U.S. PATENT DOCUMENTS

| | | | |
|---|---|---|---|
| 6,476,760 B1 * | 11/2002 | Winter et al. | 342/173 |
| 6,636,172 B1 * | 10/2003 | Prestl et al. | 342/173 |
| 6,714,156 B1 * | 3/2004 | Ibrahim et al. | 342/174 |
| 6,744,399 B2 * | 6/2004 | Tohyama et al. | 342/165 |
| 6,778,131 B2 * | 8/2004 | Haney et al. | 342/174 |
| 6,828,931 B2 * | 12/2004 | Kikuchi et al. | 342/174 |
| 6,933,883 B2 * | 8/2005 | Isaji | 342/174 |
| 6,975,265 B2 * | 12/2005 | Schlick et al. | 342/165 |
| 2002/0105456 A1 * | 8/2002 | Isaji | 342/165 |
| 2003/0090411 A1 * | 5/2003 | Haney et al. | 342/165 |

* cited by examiner

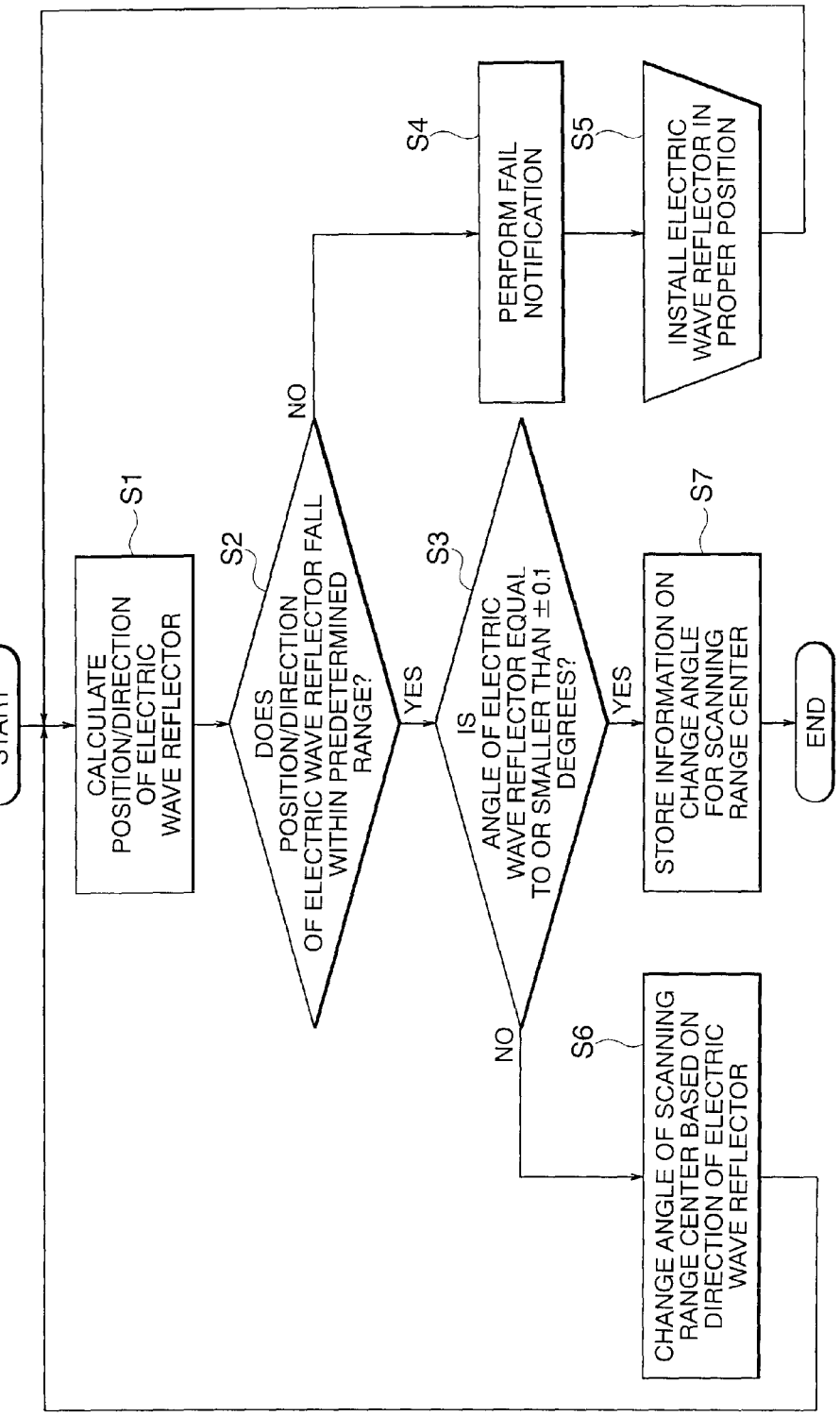

ELECTRIC WAVE AXIS ADJUSTING APPARATUS FOR RADAR MOUNTED ON VEHICLE

BACKGROUND OF THE INVENTION

1. Field of the Invention

The present invention relates to an electric wave axis adjusting apparatus for a radar mounted on a vehicle for adjusting an electric wave axis of an on-vehicle radar having a structure in which an electric wave is transmitted and an electric wave reflected by an obstacle is received, to thereby detect a position or the like of the obstacle.

2. Description of the Related Art

Heretofore, a radar mounted on a vehicle (hereinafter, referred to as "on-vehicle radar") has been utilized for an obstacle approach warning system, a vehicle-to-vehicle distance control system, a traffic congestion following system, and the like.

However, if an electric wave axis (a central axis of an electric wave or a directivity axis) and a vehicle traveling axis are not aligned with each other when the on-vehicle radar system is fixed to a vehicle, an error occurs in an angle of a detected obstacle. As a result, there is a possibility that a vehicle traveling along an adjacent traffic lane is judged to be a precedingly traveling vehicle by mistake, or a precedingly traveling vehicle is not judged to be as such by mistake.

Then, a detection range adjusting system of an obstacle detection apparatus for a vehicle is known, in which a detection range for detection of a standard reflector is set to a range narrower than a scanning range for aligning an electric wave axis and a vehicle traveling axis with each other and the detection range is changed within the scanning range so that a detection position of the standard reflector installed in a predetermined position relative to a vehicle agrees with a standard position information stored in advance (refer to JP 09-178856 A for example).

However, the detection range adjusting system having the above construction involves a problem that since the detection range is set to the range narrower than the scanning range, a wasteful range occurs in which only the scanning is carried out and no standard reflector is detected.

In addition, there is also encountered a problem that it takes time to scan the range in which the reflector as the standard reflector is not detected, and thus a delay occurs in time for detecting the reflector to be normally detected.

SUMMARY OF THE INVENTION

The present invention has been made in order to solve the above-mentioned problems, and it is, therefore, an object of the present invention to provide an electric wave axis adjusting apparatus for an on-vehicle radar which is capable of easily and precisely adjusting an electric wave axis by only changing a scanning range because the scanning range and a detection range can be made identical to each other, and of adjusting an electric wave axis of an on-vehicle radar without wasting time in order to detect a reflector.

According to the present invention, an electric wave axis adjusting apparatus for an on-vehicle radar includes: a reflector disposed in a predetermined position relative to a vehicle; and an on-vehicle radar for transmitting an electric wave toward the reflector and receiving an electric wave reflected by the reflector, to thereby detect the reflector, the on-vehicle radar including: a radar portion for generating the electric wave; scanning means for changing a transmission/reception direction of the electric wave to form within a scanning range, along with having an antenna for transmitting/receiving the electric wave; signal processing means for calculating a direction of the reflector based on amplitude of the reflected electric wave; and scanning range changing means for changing the angle of the scanning range to an axis side of the vehicle based on the direction of the reflector calculated by the signal processing means to align an electric wave axis of the on-vehicle radar with the axis.

According to the electric wave axis adjusting apparatus for an on-vehicle radar of the present invention, the electric wave axis can be readily aligned with the axis of the vehicle by changing the scanning range, and also the electric wave axis can be adjusted without wasting time in order to detect the reflector.

BRIEF DESCRIPTION OF THE DRAWINGS

In the accompanying drawings:

FIG. 4 is a flow chart explaining a method of adjusting an electric wave axis of an on-vehicle radar using the electric wave axis adjusting apparatus for an on-vehicle radar according to Embodiment 1 shown in FIG. 1.

DETAILED DESCRIPTION OF THE PREFERRED EMBODIMENTS

Embodiment 1

Figure 1:
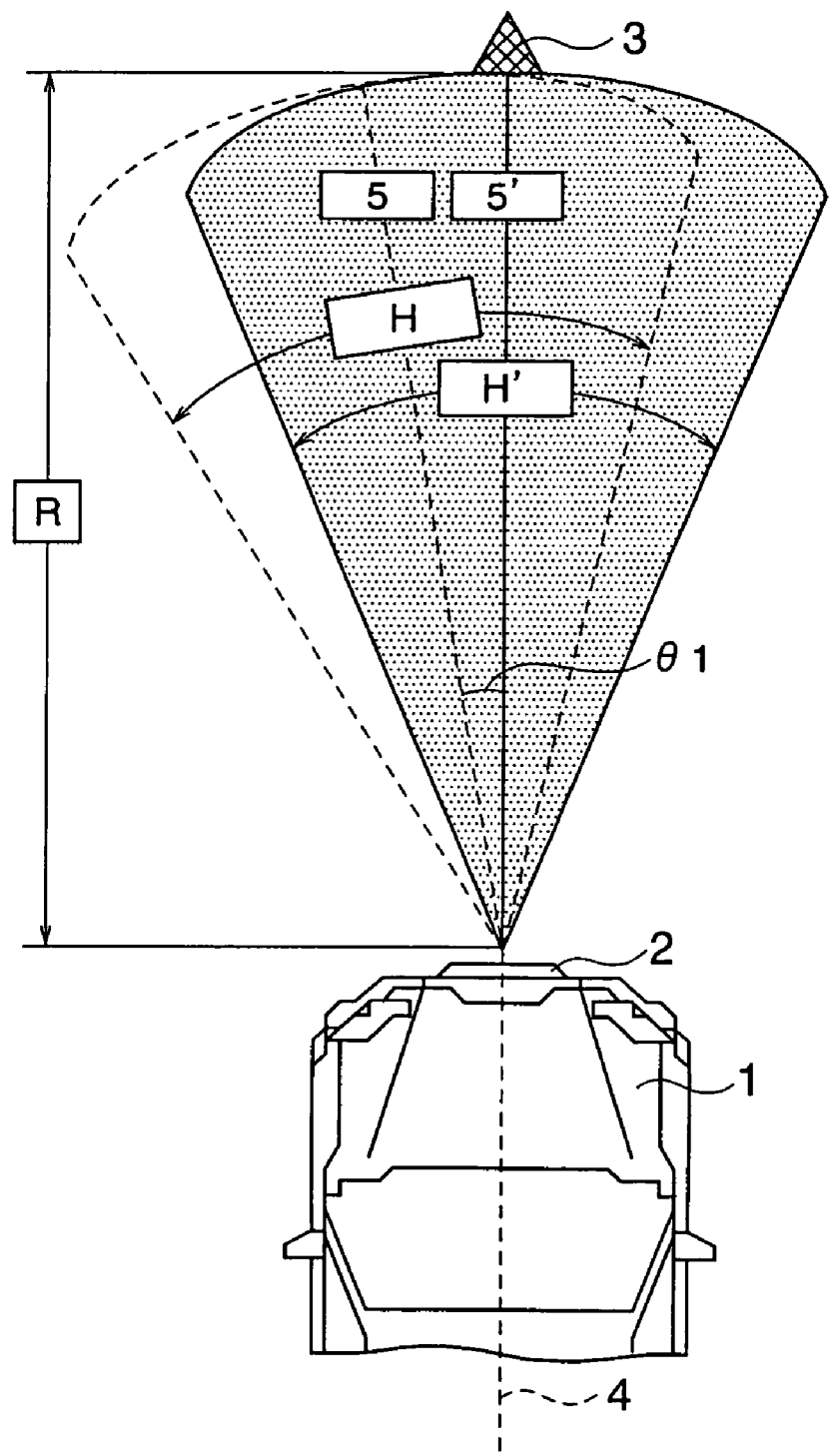
FIG. 1 is a plan view explaining an electric wave axis adjusting apparatus for an on-vehicle radar according to Embodiment 1 of the present invention.
Figure 2:
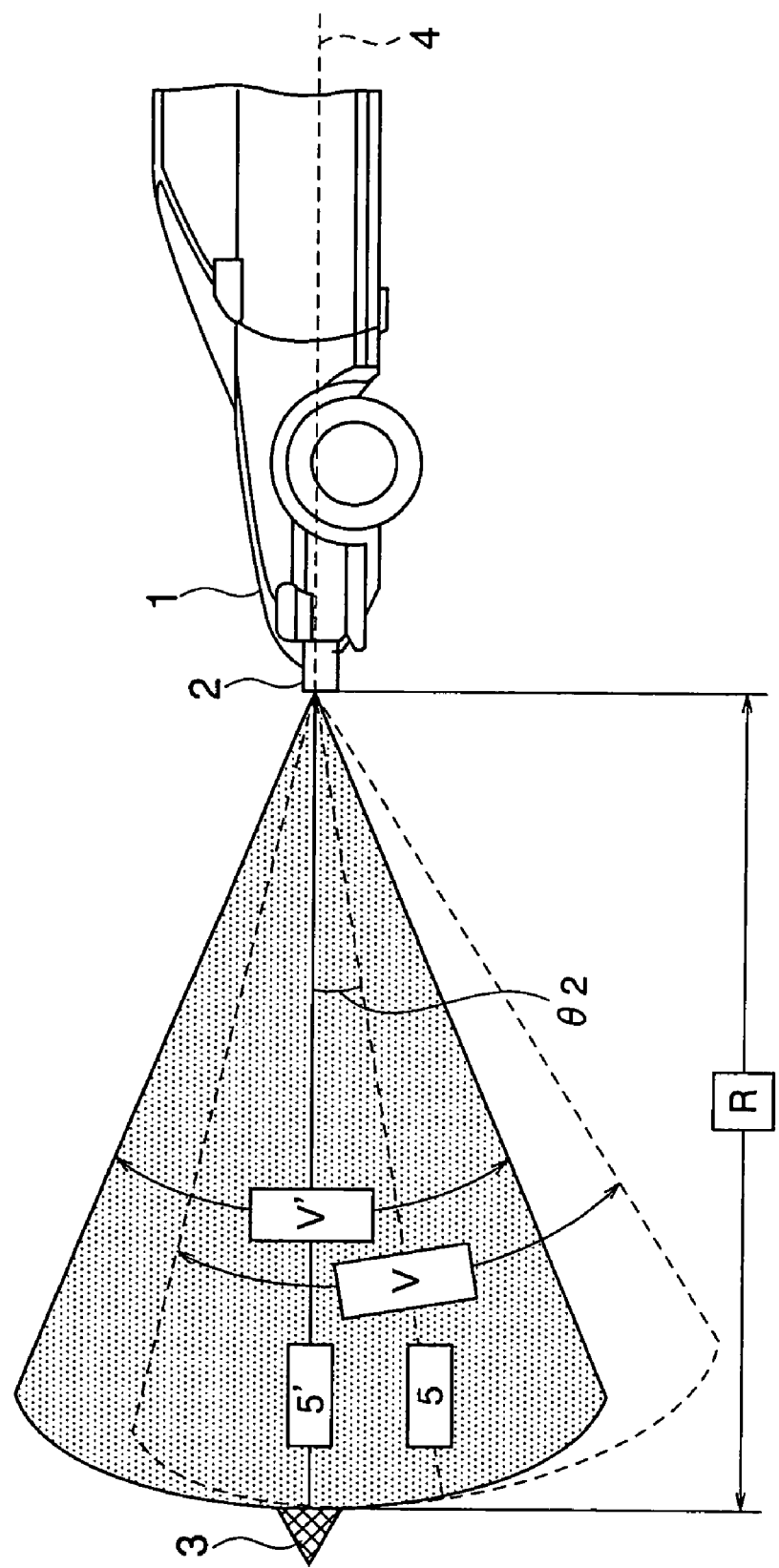
FIG. 2 is a side elevation view explaining the electric wave axis adjusting apparatus for an on-vehicle radar according to Embodiment 1 of the present invention.

FIG. 1 is a plan view explaining an electric wave axis adjusting apparatus for a radar 2 mounted on a vehicle according to Embodiment 1 of the present invention, and FIG. 2 is a side elevation view explaining the electric wave axis adjusting apparatus for an on-vehicle radar according to Embodiment 1 of the present invention.

The electric wave axis adjusting apparatus for a radar 2 mounted on a vehicle (hereinafter referred to as "an on-vehicle radar 2") includes a reflector 3 disposed in front of a vehicle 1 and the on-vehicle radar 2 mounted to a center of a front grille portion of the vehicle 1 for transmitting an electric wave toward the reflector 3 and receiving an electric reflected by the reflector 3, to thereby detect the reflector 3.

The reflector 3 is a corner reflector for example and is installed at a point on a vehicle traveling axis 4 as an axis of the vehicle 1 at a distance R of 5 m for example from the front side of the vehicle 1.

In FIG. 1, the angle range indicated by a broken line represents a horizontal scanning range H of the on-vehicle radar 2 before adjustment of the electric wave axis 5 of the on-vehicle radar 2. Then, the horizontal scanning range H of the on-vehicle radar 2 is also a detection range H for the reflector 3. Here, the electric wave axis 5 is a central axis of the sector-like range and lies on an axis with respect to which the scanning range shows bilateral symmetry (hereinafter referred to as "a bilateral symmetry axis").

On the other hand, the angle range indicated by a solid line represents a horizontal scanning range H' of the on-vehicle radar 2 after adjustment of the electric wave axis 5' of the on-vehicle radar 2. Then, the horizontal scanning range H' of the on-vehicle radar 2 is also a detection range H' for the reflector 3. Here, the electric wave axis 5' is a central axis of the sector-like range and lies on a bilateral symmetry axis.

Similarly, in FIG. 2, an angle range indicated by a broken line represents a vertical scanning range V of the on-vehicle radar 2 before adjustment of the electric wave axis 5 of the on-vehicle radar 2. Then, the vertical scanning range V of the on-vehicle radar 2 is also the direction range V for the reflector 3. Here, the electric wave axis 5 is a central axis of the sector-like range and lies on a bilateral symmetry axis.

On the other hand, an angle range indicated by a solid line represents a vertical scanning range V' of the on-vehicle radar 2 after adjustment of the electric wave axis 5' of the on-vehicle radar 2. Then, the vertical scanning range V' of the on-vehicle radar 2 is also the direction range V' for the reflector 3. Here, the electric wave axis 5' is a central axis of the sector-like range and lies on a bilateral symmetry axis.

Then, the electric wave axis adjusting apparatus for the on-vehicle radar 2 changes the scanning ranges H and V to the scanning ranges H' and V' based on a direction of the reflector 3, that is, aligns the electric wave axis 5' with the vehicle traveling axis 4. The electric wave axis adjustment is automatically carried out.

Figure 3:
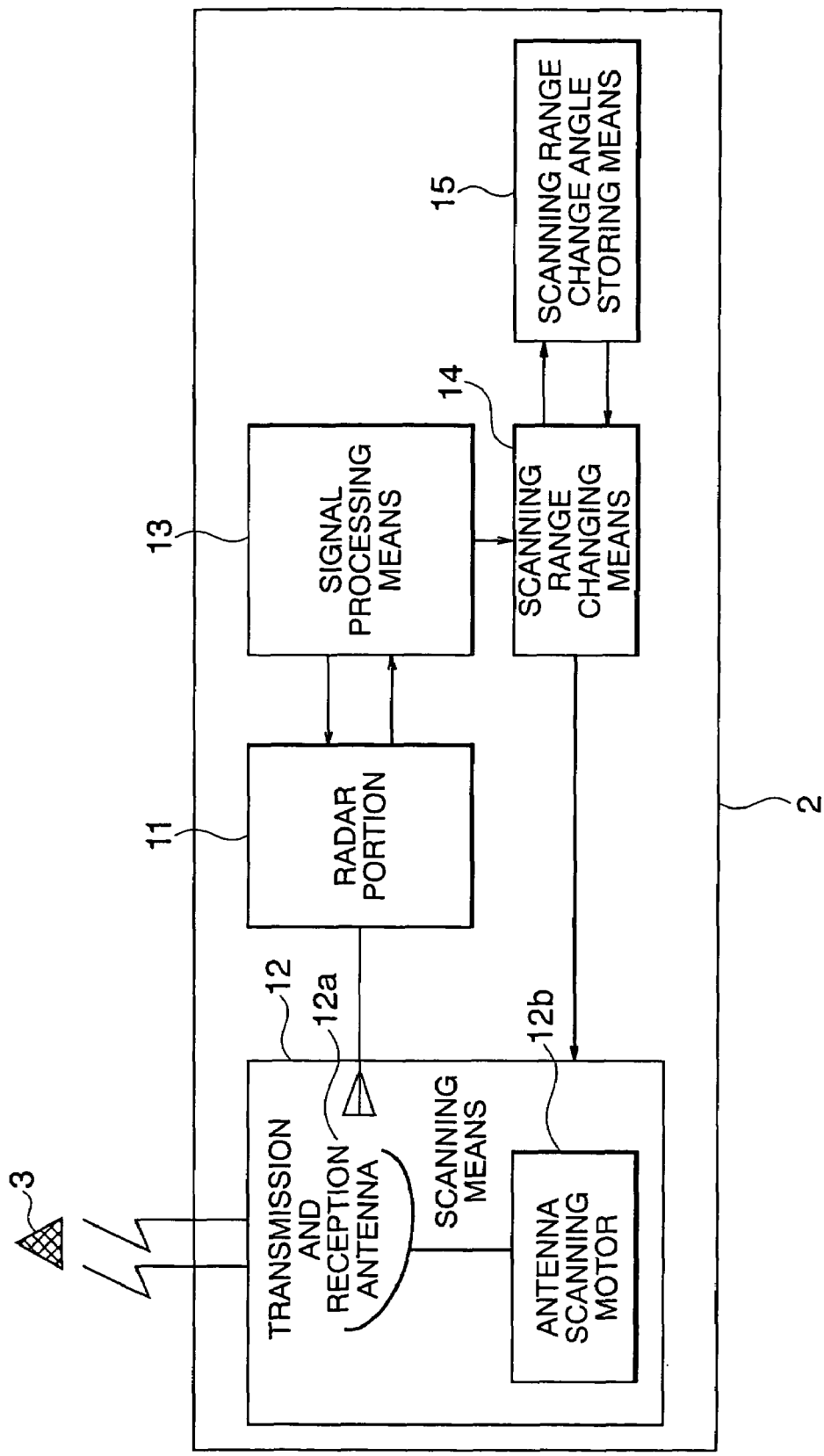
FIG. 3 is a block diagram showing a configuration of the electric wave axis adjusting apparatus for an on-vehicle radar according to Embodiment 1 shown in FIG. 1.

FIG. 3 is a block diagram showing a configuration of the electric wave axis adjusting apparatus for the on-vehicle radar 2 according to Embodiment 1 shown in FIG. 1.

The on-vehicle radar 2 includes: a radar portion 11 for generating an electric wave: scanning means 12 for changing a transmission/reception direction of the electric wave to form within a scanning range, along with having an antenna 12a for transmitting/receiving an electric wave; signal processing means 13 for calculating a direction of the reflector 3 based on the amplitude of a reflected electric wave; scanning range changing means 14 for changing the angle of the scanning range to a vehicle traveling axis 4 side based on the direction of the reflector 3 calculated by the signal processing means 13 to align the electric wave axis 5 of the on-vehicle radar 2 with the vehicle traveling axis 4 of the vehicle 1; and scanning range change angle storing means 15 for storing therein information on change angles θ1 and θ2 for the scanning range in the scanning range changing means 14.

The scanning means 12 further includes an antenna scanning motor for moving horizontally and vertically the transmission and reception antenna 12a.

In the vehicle radar 2 having the above configuration, the electric wave generated by the radar portion 11 is transmitted through the transmission and reception antenna 12a. During the transmission of the electric wave, the electric wave is horizontally and vertically scanned by driving of the antenna scanning motor 12b. After the electric wave is reflected by the reflector 3 and the reflected electric wave is then received by the transmission and reception antenna 12a, the signal processing means 13 processes the reflected electric wave within the scanning ranges H and V to calculate position and direction of the reflector 3 and instructs the scanning range changing means 14 to move the scanning ranges H and V.

The scanning range changing means 14 changes and sets the scanning ranges H and V in accordance with the instruction issued from the signal processing means 13. In a next cycle, the electric wave radiated from the radar portion 11 is scanned within the scanning ranges H and V updated by the driving of the antenna scanning motor 12b, the transmission and reception antenna 12a receives the reflected electric wave obtained through the re-reflection by the reflector 3, and the signal processing means 13 processes the reflected electric wave within the new scanning ranges H and V again to calculate a direction of the reflector 3.

The above-described procedure is carried out by repeatedly changing the scanning ranges H and V at intervals of 0.1 degree to the vehicle traveling axis 4 side until the direction (angle) of the reflector 3 calculated by the signal processing means 13 falls within ±0.1 degrees with respect to the vehicle traveling axis 4.

When the direction (angle) of the reflector 3 finally falls within ±0.1 degrees with respect to the vehicle traveling axis 4, the electric wave axis 5 of the on-vehicle radar 2 is regarded as being aligned with the vehicle traveling axis 4. Then, information on a change angle θ1 between the central line (the electric wave axis 5) of the horizontal scanning range H of the on-vehicle radar 2 before adjustment of the electric wave axis 5 of the on-vehicle radar 2 and the vehicle traveling axis 4, and information on a change angle θ2 between the central line (the electric wave axis 5) of the vertical scanning range V of the on-vehicle radar 2 before adjustment of the electric wave axis 5 of the on-vehicle radar 2 and the vehicle traveling axis 4 are stored in the scanning range change angle storing means 15.

A procedure for horizontally adjusting the electric wave axis 5 of the on-vehicle radar 2 using the electric wave axis adjusting apparatus for the on-vehicle radar 2 described above will hereinafter be described based on a flow chart shown in FIG. 4. Note that the vertical adjustment for the electric wave axis 5 of the on-vehicle radar 2 is similarly carried out, and hence its description is omitted here for the sake of simplicity.

Prior to start of an operation based on the flow chart shown in FIG. 4, the reflector 3 is installed on the vehicle traveling axis 4, and an operation mode of the on-vehicle radar 2 is set to an electric wave axis adjustment mode.

First of all, the electric wave radiated through the transmission and reception antenna 12a is horizontally scanned by the driving of the antenna scanning motor 12b to calculate a position/direction of the reflector 3 (Step S1).

It is judged by the calculated the position/direction of the reflector 3 whether or not the position/direction of the reflector 3 falls within a predetermined range (Step S2). When the judgment results show that the position/direction of the reflector 3 is beyond the predetermined range, the position of the reflector 3 is judged to be unsuitable, and a fail notification is carried out (Step S4). Then, the reflector 3 is reinstalled in the proper position (Step S5).

On the other hand, when the judgment results show that the position/direction of the reflector 3 falls within the predetermined range, it is judged whether or not the direction (angle) of the reflector 3 falls within ±0.1 degrees (Step S3).

When the judgment results show that the direction (angle) of the reflector 3 is equal to or larger than ±0.1 degrees, the scanning range H of the on-vehicle radar 2 is changed to the vehicle traveling axis 4 side for example (Step S6). The change of the angle is repeatedly carried out at intervals of 0.1 degrees until the direction (angle) of the reflector 3 finally falls within ±0.1 degrees.

On the other hand, when the judgment results show that the direction (angle) of the reflector 3 falls within ±0.1 degrees, the electric wave axis 5 of the on-vehicle radar 2 is judged as being aligned with the vehicle traveling axis 4 as shown in FIG. 1. Then, the information on the change angle θ1 between the central line (the electric wave axis 5) of the horizontal scanning range H of the on-vehicle radar 2 before adjustment of the electric wave axis 5 of the on-vehicle radar 2, and the vehicle traveling axis 4 is stored in the scanning range change angle storing means 15. Then, the electric wave axis adjustment mode is completed (Step S7).

The processings until now correspond to the adjustment for the electric wave axis 5 of the on-vehicle radar 2 which is carried out in a production line for the vehicle 1.

Thereafter, when the on-vehicle radar 2 intends to detect a position/direction of an obstacle during the traveling drive of the vehicle 1, the on-vehicle radar 2 reads out the information on the change angle θ1 from the scanning range change angle storing means 15 to detect the position/direction of the obstacle.

As described above, according to the electric wave axis adjusting apparatus for the on-vehicle radar 2 of Embodiment 1, the scanning range changing means 14 changes the angle of the scanning ranges H and V to the vehicle traveling axis 4 side based on the signal from the signal processing means 13 for calculating a direction (angle) of the reflector 3 based on amplitude of an electric wave reflected by the reflector 3 to align the electric wave axis 5 of the on-vehicle radar 2 with the vehicle traveling axis 4. Consequently, the electric wave axis 5 can be readily and precisely adjusted.

In addition, in order to detect the reflector 3, the electric wave axis 5 of the on-vehicle radar 2 can be adjusted without wasting time.

In addition, the scanning range changing means 14 repeatedly changes the scanning ranges H and V at intervals of 0.1 degrees until the direction (angle) of the reflector 3 calculated by the signal processing means 13 falls within ±0.1 degrees with respect to the vehicle traveling axis 4. Consequently, the electric wave axis 5 can be precisely aligned with the vehicle traveling axis 4.

In addition, the electric wave axis adjusting apparatus for the on-vehicle radar 2 includes the scanning range change angle storing means 15 for storing therein the information on the change angles θ1 and θ2 for the scanning ranges H and V which are obtained by the scanning range changing means 14. Thus, there is no necessity for adjusting the electric wave axis 5 again. Consequently, in driving the vehicle 1, the on-vehicle radar 2 can detect speedily and precisely position and direction of an obstacle.

In addition, each of the scanning ranges H and V is symmetrical with the electric wave axis 5 as the central line. Hence, the scanning range changing means 14 can readily change the scanning ranges H and V by changing the angle of the central line.

Also, only when the position/direction of the reflector 3 falls within the predetermined range, the scanning range changing means 14 changes the scanning ranges H and V by driving the scanning means 12. Hence, for example, it can be prevented that in the production line the electric wave axis 5 is adjusted using a reflector such as a wall existing in the rear of the reflector 3 as a reference.

Also, when the position/direction of the reflector 3 is beyond the predetermined range, the scanning range changing means 14 carries out the fail notification for adjustment for the electric wave axis 5. Hence, an assembler in the production line can simply know that the position/direction of the reflector 3 is beyond the predetermined range.

Note that while in Embodiment 1 the description has been given with respect to the case where the on-vehicle radar 2 is mounted to the center of the front grille portion of the vehicle 1 as the position where the on-vehicle radar 2 is to be mounted to the vehicle 1, the mounting position is not limited to that position. For example, the on-vehicle radar 2 may be mounted to the rear of the vehicle 1.

Also, the reflector 3 does not need to be disposed right in front of the vehicle 1.

In addition, each of the scanning ranges H and V is not limited to the case where each of the scanning ranges H and V shows bilateral and vertical symmetry with respect to the electric wave axis 5 as a central line. That is, each of the scanning ranges H and V may show asymmetry with respect to the electric wave axis 5.

Also, the scanning range changing means 14 may change the scanning ranges H and V at a time by an inner angle between the direction of the reflector 3 calculated by the signal processing means 13 and the vehicle traveling axis 4.

In this case, the electric wave axis 5 can be speedily aligned with the vehicle traveling axis 4.

Moreover, each of the change angles θ1 and θ2 between the central lines of the scanning ranges H and V of the on-vehicle radar 2 before adjustment of the electric wave axis 5 of the on-vehicle radar 2 and the vehicle traveling axis 4 may also be made zero by adjusting the position of the transmission and reception antenna 12a in the production line for example.

In this case, the scanning range change angle storing means 15 becomes unnecessary, and hence the configuration of the on-vehicle radar 2 is simplified.

What is claimed is:

1. An electric wave axis adjusting apparatus for an on-vehicle radar, comprising:
    a reflector disposed in a predetermined position relative to a vehicle; and
    an on-vehicle radar for transmitting an electric wave toward the reflector and receiving an electric wave reflected by the reflector, to thereby detect the reflector, the on-vehicle radar comprising:
    a radar portion for generating the electric wave;
    scanning means for changing a transmission/reception direction of the electric wave to form within a scanning range, along with having an antenna for transmitting/receiving the electric wave;
    signal processing means for calculating a direction of the reflector based on amplitude of the reflected electric wave; and
    scanning range changing means for changing the angle of the scanning range to an axis side of the vehicle based on the direction of the reflector calculated by the signal processing means to align an electric wave axis of the on-vehicle radar with the axis.

2. An electric wave axis adjusting apparatus for an on-vehicle radar according to claim 1, wherein the scanning range changing means repeatedly changes the scanning range at intervals of 0.1 degrees to the axis side until the direction of the reflector calculated by the signal processing means falls within ±0.1 degrees with respect to the axis.

3. An electric wave axis adjusting apparatus for an on-vehicle radar according to claim 1, wherein the scanning range changing means changes the scanning range at a time by an inner angle between the direction of the reflector calculated by the signal processing means and the axis.

4. An electric wave axis adjusting apparatus for an on-vehicle radar according to claim 1, further comprising scanning range change angle storing means for storing therein information on a change angle for the scanning range obtained by the scanning range changing means, wherein during drive of the vehicle, the scanning range changing means changes the scanning range based on the information on the change angle from the scanning range change angle storing means.

5. An electric wave axis adjusting apparatus for an on-vehicle radar according to claim 1, wherein the scanning range is symmetrical with respect to the electric wave axis as a central line, and the scanning range changing means changes an inner angle between the central line and the axis.

6. An electric wave axis adjusting apparatus for an on-vehicle radar according to claim 1, wherein only when a position/direction of the reflector falls within a predetermined range, the scanning range changing means changes the scanning range by driving the scanning means.

7. An electric wave axis adjusting apparatus for an on-vehicle radar according to claim 1, wherein when the position/direction of the reflector is beyond the predetermined range, the scanning range changing means carries out a fail notification for adjustment for the electric wave axis.

* * * * *